(12) United States Patent
Goldsmith

(10) Patent No.: US 6,415,274 B1
(45) Date of Patent: Jul. 2, 2002

(54) ALPHA-BETA COORDINATION METHOD FOR COLLECTIVE SEARCH

(75) Inventor: Steven Y. Goldsmith, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/339,786

(22) Filed: Jun. 24, 1999

(51) Int. Cl.[7] .............................................. G06F 9/445

(52) U.S. Cl. ............................ 706/45; 706/16; 706/17

(58) Field of Search ........................... 706/13, 20, 45, 706/16, 17; 700/213; 701/23

(56) References Cited

U.S. PATENT DOCUMENTS

| | | | | |
|---|---|---|---|---|
| 5,388,189 A | * | 2/1995 | Kung | 706/45 |
| 5,778,150 A | * | 7/1998 | Chan et al. | 706/46 |
| 5,832,467 A | * | 11/1998 | Wavish | 706/13 |
| 5,896,297 A | * | 4/1999 | Valerino, Sr. | 700/213 |
| 5,970,482 A | * | 10/1999 | Pham et al. | 706/16 |
| 6,021,403 A | * | 2/2000 | Horvitz et al. | 706/45 |
| 6,122,572 A | * | 9/2000 | Yavnai | 701/23 |
| 6,247,002 B1 | * | 6/2001 | Sreels | 706/20 |

OTHER PUBLICATIONS

Mobile networking in the Internet, Charles E. Perkins, ACM (1998) Mobile Networks and Application 3 (1998) pp. 319–334.*

Experiences with network–based user agents for mobile applications, Thomas F. La Porta, Ranachandran Ramjee, Thomas Woo, Krishan K. Sabnani, ACM (1998) Mobile Networks and Applications 3 (1998) pp. 123–141.*

Strategies for Distributed Search, Michael A. Bauer, Tong Wang, ACM (1992) 089791–472–4/92/0002/0251.*

Managed File Distribution on the Universe Network, Christopher S. Cooper, ACM (1984) 0–89791–136–9/84/006/0010.*

Active mobile robot localization by entropy minimization, Burgard, W., Fox, D., Thrun, S., Advanced Mobile Robots, 1997, Proceedings., Second EUROMICRO workshop on, 1997 pp. 155–162.*

(List continued on next page.)

Primary Examiner—Thomas Black
Assistant Examiner—Michael B. Holmes
(74) Attorney, Agent, or Firm—V. Gerald Grafe (57) ABSTRACT

The present invention comprises a decentralized coordination strategy called alpha-beta coordination. The alpha-beta coordination strategy is a family of collective search methods that allow teams of communicating agents to implicitly coordinate their search activities through a division of labor based on self-selected roles and self-determined status. An agent can play one of two complementary roles. An agent in the alpha role is motivated to improve its status by exploring new regions of the search space. An agent in the beta role is also motivated to improve its status, but is conservative and tends to remain aggregated with other agents until alpha agents have clearly identified and communicated better regions of the search space. An agent can select its role dynamically based on its current status value relative to the status values of neighboring team members. Status can be determined by a function of the agent's sensor readings, and can generally be a measurement of source intensity at the agent's current location. An agent's decision cycle can comprise three sequential decision rules: (1) selection of a current role based on the evaluation of the current status data, (2) selection of a specific subset of the current data, and (3) determination of the next heading using the selected data. Variations of the decision rules produce different versions of alpha and beta behaviors that lead to different collective behavior properties.

20 Claims, 4 Drawing Sheets

$\phi$-alpha agent
excitation $e_{\alpha\phi}, e_{\beta\phi}$ :    IF $z_i(k) = z^*(k)$ THEN ISA $(a_i, \phi - alpha)$
                   where $z^*(k)$ is max$\{z_i(k)\}$
system equation:    $v_\phi(k+1) = v_\phi(k) : v_\phi(k) = \max \int z(k)\{[\sim(k), v(k)]\}$ alpha agents
excitation $e_{\alpha\phi}, e_{\beta\phi}$ :    IF $z_b(k) < z_i(k) < z^*(k)$ THEN ISA $(a_i, alpha)$
                   where $z_b(k)$ is the maximum beta measurement
system equation:    $v_i(k+1) = v_i(k) + \mu(v_\phi(k) - v_i(k))$ beta agents
excitation $e_{\alpha\phi}, e_{\beta\alpha}$ :    IF $z_i(k) \leq z_b$ THEN ISA $(\alpha_i, beta)$
system equation:    $v_i(k+1) = v_i(k) + \sum_{v_j(k) \in A_i} P_{ij}(k)(v_j(k) - v_i(k))$
                  where $P_{ij}(k) = z_{ij}(k)/\sum z_{ij}(k)$ (normalized sensor readings)
                  and $A_i = \{v_j(k)_{\sim j} | \int_j(k) > \int_{-}(k)\}$, ($i^{th}$ alpha cohort)

OTHER PUBLICATIONS

Stochastic prediction of human motion and control of robots in the service of human Tadokoro, S.; Ishikawa Y.; Takebe, T.; Takamori, T. Systems, Man and Cybernetics, 1993. 'Systems Engineering in the Service of Humans', 1993 pp. 503–508 vol. 1.*

Early Power Exploration—A World Wide Web Application, David Lidsky, Jan M. Rabaey, 33$^{rd}$ Design Automation Conference, ACM (1996) 0–89791–833–9/96/0006.*

SPIE Proceeding vol. 1831, Mobile Robots VII, Editor(s) William J. Wolfe, Univeristy of Colorado/Denver, Littleton, CO, USA;Wendell H. Chun, Martin Marietta Astronautics Group, Denver, CO, USA. ISBN: 0–8194–1032–2, Nov. 20, 1992, Boston MA, USA.*

SPIE Proceeding vol. 3523, Sensor Fusion and Decentralized Control in Robotics Systems, Editor(s): Paul S. Schenker, Jet Propulsion Lab., Pasadena, CA, USA; Gerald T. McKee, University of Reading, Reading, United Kingdom.ISBN: 0–8194–2984–8, Nov. 6, 1998.*

Self–Organization in Large Populations of Mobile Robots, Cem Unsal, Thesis, Master of Science in Electrical Ingineering, Virginia Polytechnic Institute and State University, May 1993, Blacksburg, Virginia.*

Sensor Models for AHS Simulations, Cem Unsal, Feb. 1998, The Robotics Institute, Carnegie Mellon University, Pittsburgh, Pennsylvania.*

Human Driver Models for AHS Simulations, Cem Unsal, Feb. 1998, The Robotics Institute, Carnegie Mellon University, Pittsburgh, Pennsylvania.*

Cornelis J. Drebbel Research Institute for Systems Engineering, 1998, Drebbel Institute, University of Twente, Netherlands.*

Multiagents Systems, A Mordern Approach to Distributed Artifical Intelligence, Gerland Weiss.*

The History Heuristic and Alpha–Beta Search Enhancements in Practice, Jonathan Schaefer, 1989 IEEE Press.*

Consistent Linear Speedup in Parallel Alpha–Beta Search, Rattikorn Hewett and Krishnarnurthy Ganesan, 1992, IEEE Press.*

Cao, et al, "Cooperative Mobile Robotics: Antecedents and Directions," Proceedings of IEEE/RSJ IROS (1995).*

Reynolds, "Flocks, Herds and Schools," *Computer Graphics*, vol. 21 No. 4, pp. 25–34 (1987).*

Brooks, "Intelligence Without Reason," Proceedings IJCAO–91 (1991).*

Misawa, "Discrete–Time Sliding Mode Control: The Linear Case," *Journal of Dynamic Systems, Measurement, and Control*, vol. 119 (1997).*

* cited by examiner

FIG. 1

| | |
|---|---|
| $\phi$-alpha agent | |
| excitation $e_{\alpha\phi}, e_{\beta\phi}$ : | IF $z_i(k) = z*(k)$ THEN ISA $(a_i, \phi - alpha)$ |
| | where $z*(k)$ is $\max\{z_i(k)\}$ |
| system equation: | $v_\phi(k+1) = v_\phi(k) : v_\phi(k) = \max \int z(k)\{[\approx (k), v(k)]\}$ |
| alpha agents | |
| excitation $e_{\alpha\phi}, e_{\beta\phi}$ : | IF $z_b(k) < z_i(k) < z*(k)$ THEN ISA $(a_i, alpha)$ |
| | where $z_b(k)$ is the maximum beta measurement |
| system equation: | $v_i(k+1) = v_i(k) + \mu(v_\phi(k) - v_i(k))$ |
| beta agents | |
| excitation $e_{\alpha\phi}, e_{\beta\phi}$ : | IF $z_i(k) \le z_b$ THEN ISA $(\alpha_i, beta)$ |
| system equation: | $v_i(k+1) = v_i(k) + \sum_{v_i(k) \in A_i} P_{ij}(k)(v_j(k) - v_i(k))$ |
| | where $P_{ij}(k) = z_i(k) / \sum z_{ij}(k)$ (*normalized sensor readings*) |
| | and $A_i = \{v_j(k)_{i \ne j} \mid \int_j(k) > \int_i(k)\}_b$, ($i^{th}$ *alpha cohort*) |

ALPHA-BETA COORDINATION METHOD FOR COLLECTIVE SEARCH

This invention was made with Government support under Contract DE-AC04-94AL85000 awarded by the U.S. Department of Energy. The Government has certain rights in the invention.

BACKGROUND OF THE INVENTION

This invention relates to the field of coordinating multiple agents in collective searching, specifically coordinating mobile robots for collective searching.

Many challenging applications in robotics involve distributed searching and sensing by a team of robots. Examples include mapping minefields, extraterrestrial and undersea exploration, volcano exploration, location of chemical and biological weapons, and location of explosive devices. In general, such applications can involve rough terrain including obstacles, non-stationary and dilute search goals, deliberate interference with the searchers, and limited opportunities for human interaction with the searchers. Limited human intervention makes teleoperation problematic, and suggests a need for decentralized coordination schemes which feature collective decision-making by individual autonomous robots. Cost considerations when applied to large groups of searchers suggest a need for distributed coordination that uses shared data to overcome limited sensor precision.

Designing a robot team to search a sensate region for a specific target phenomenon involves numerous engineering tradeoffs among robot attributes and environmental variables. For example, battery-powered robots have a finite energy store and can search only a limited area before depleting it. Success in finding a target source with finite energy resources can also depend on other characteristics of the robot such as sensor accuracy and noise, and efficiency of the locomotive subsystem, and well as properties of the collective search such as the number of robots in the team, the use of shared information to reduce redundant search, and the team coordination strategy used to ensure a coherent search process.

Numerous team coordination strategies have been proposed. See, e.g., Cao et al. "Cooperative Mobile Robotics: Antecedents and Directions", Proceedings of IEEE/RSJ IROS (1995). Strategies for cooperative action encompass theories from such diverse disciplines as artificial intelligence, game theory and economics, theoretical biology, distributed computing and control, animal ethology, and artificial life. For example, Reynolds simulated the formation of flocks, herds, and schools in which multiple autonomous agents were driven away from obstacles and each other by inverse square law repulsive forces. See Reynolds "Flocks, Herds, and Schools", Computer Graphics, Volume 21 No. 4, pp. 25–34 (1987). Part of the motivation behind Reynolds' work is the impression of centralized control exhibited by actual bird flocks, animal herds, and fish schools, despite the fact that each agent (bird, animal, or fish) is responding only to its limited range local perception of the world.

Most current coordination strategies do not include a formal development of the system dynamics. See, e.g., Brooks "Intelligence Without Reason", Proceedings IJCAO-91 (1991); Misawa "Discrete-Time Sliding Mode Control: the Linear Case", Journal of Dynamic Systems, Measurement, and Control, Volume 119 (1997). Consequently, important system properties such as stability, reachability, observability, and robustness cannot be characterized. Many of the schemes rely on stable controls at a lower level and provide coordination at a higher level. The coordination is often heuristic and ad hoc.

Appropriate coordination strategies can be used in applications beyond teams of physical robots. For example, autonomous software agents, properly coordinated, can search information or trends in cyberspace or other electronic storage.

Accordingly, there is a need for a coordination method that can use shared information to reduce energy expended, compensate for noisy or deliberately misleading sensors, and allow robust collective searching.

SUMMARY OF THE INVENTION

The present invention comprises a decentralized coordination strategy called alpha-beta coordination that can use shared information to reduce energy expended, compensate for noisy or deliberately misleading sensors, and allow robust collective searching. The alpha-beta coordination strategy is a family of collective search methods that allow teams of communicating agents to implicitly coordinate their search activities through a division of labor based on self-selected roles and self-determined status. An agent can play one of two complementary roles. An agent in the alpha role is motivated to improve its status by exploring new regions of the search space. An agent in the beta role is also motivated to improve its status, but is conservative and tends to remain aggregated with other agents until alpha agents have clearly identified and communicated better regions of the search space. An agent can select its role dynamically based on its current status value relative to the status values of neighboring team members. Status can be determined by a function of the agent's sensor readings, and can generally be a measurement of source intensity at the agent's current location. An agent's decision cycle can comprise three sequential decision rules: (1) selection of a current role based on the evaluation of the current status data, (2) selection of a specific subset of the current data, and (3) determination of the next heading using the selected data. Variations of the decision rules produce different versions of alpha and beta behaviors that lead to different collective behavior properties.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 3($a,b$) illustrates the learning curves for various alpha-beta ratios.

DETAILED DESCRIPTION OF THE INVENTION

The present invention comprises a decentralized coordination strategy called alpha-beta coordination. The alpha-beta coordination strategy is a family of collective search methods that allow teams of communicating agents to implicitly coordinate their search activities through a division of labor based on self-selected roles and self-determined status. An agent can play one of two complementary roles. An agent in the alpha role is motivated to improve its status by exploring new regions of the search space. An agent in the beta role is also motivated to improve its status, but is conservative and tends to remain aggregated with other agents until alpha agents have clearly identified and communicated better regions of the search space. An agent can select its role dynamically based on its current status value relative to the status values of neighboring team members. Status can be determined by a function of the agent's sensor readings, and can generally be a measurement of source intensity at the agent's current location. An agent's decision cycle can comprise three sequential decision rules: (1) selection of a current role based on the evaluation of the current status data, (2) selection of a specific subset of the current data, and (3) determination of the next heading using the selected data. Variations of the decision rules produce different versions of alpha and beta behaviors that lead to different collective behavior properties.

Figure 4:
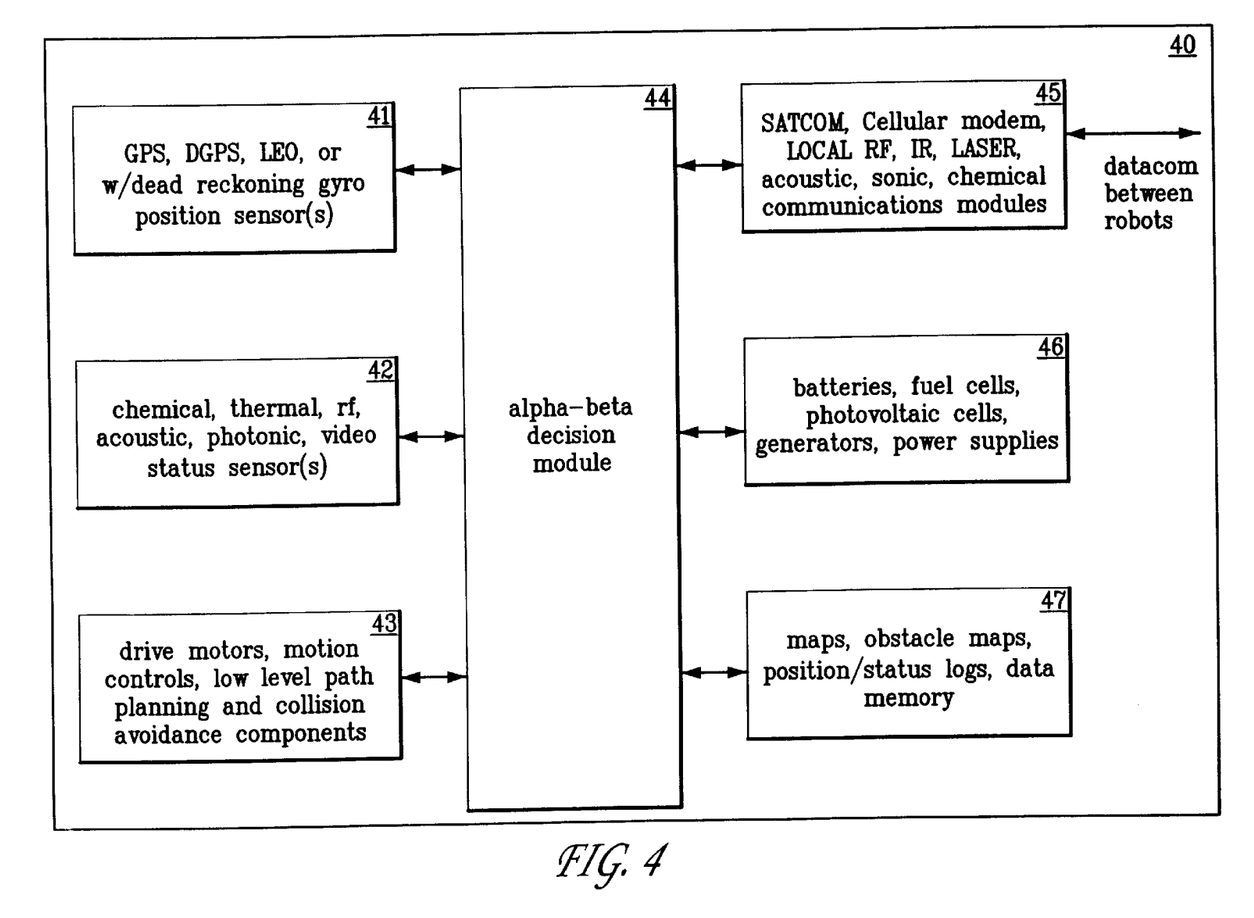
FIG. 4 is a functional diagram of a robot suitable for use with the present invention.

Alpha-beta coordination strategy can be used to coordinate robots such as the robot 40 shown functionally in FIG. 4. Each robot 40 can comprise a position sensor 41 and a sensor 42 sensitive to the search goal. An alpha-beta coordination module 44 can access sensors 41, 42 communicate with other robots via communication module 45, and access additional information and memory 47 to control robot motion 43, 46. Partitioning a robot team into alpha and beta roles can produce a balance between exploration and exploitation. Alpha agents can expend energy exploring low status regions of the search space, but can communicate valuable state information to team members that can prevent costly re-exploration of low status regions. Alpha agents can seek to emulate and ultimately surpass the highest-performing team members and consequently can be more sensitive to the effects of transient noise and more susceptible to false status values. Beta agents can use energy conservatively by resisting transient influences and moving in a direct path to high status regions of the search space identified by alpha agents. Beta agents can resist noise and false status values by selective resampling and averaging of status data, but must rely on alpha agents to improve their status. Consequently, beta agents can be misled by noise and false status under some circumstances through second order effects if many alpha agents are misled.

The alpha-beta coordination strategy relies on the following assumptions:
1. agents have a reliable communications mechanism;
2. agents are positioned in the sensate region surrounding a target or goal;
3. the objective is to converge the agents on the target or goal;
4. a higher status value implies a higher probability that the target is located near the corresponding agent.

Alpha-beta agents search without centralized leadership or hierarchical coordination. The primary collective behavior of an alpha-beta team is to aggregate in a region of high intensity. Alpha-beta teams are robust to single point fail/stop failures in team members since agents can simply use the latest data transmitted by other team members without regard to the identity of the sender. Alpha-beta coordination can require minimal knowledge about the search environment. Agents need no prior assumptions about the nature of the intensity surface, its spatial coherence, gradient field, or any other analytical information. Individual agents need have no sensor memory, but without sensor memory can not locate a source alone. Accordingly, alpha-beta coordination is a reactive collective search strategy rather than a collaborative strategy. Agents are implicitly cooperative, and do not use explicit forms of collaboration.

A simple social metaphor can provide an intuitive but imprecise description of the basis for alpha-beta coordination. The cohesion of an alpha-beta society is based on a common normative goal: each agent is motivated to improve its social status by associating with other agents of higher status. Social status can be determined by a scalar function of the shared sensor data communicated by other agents. The only assumption underlying alpha-beta coordination is that the status function orders points in the search space according to the probability that a source is located at the point. On each decision cycle, each agent $\alpha_i$ broadcasts its current social status as a scalar value $s_i$ and a location vector $v_i$ to all other agents, and receives their status values in return. An agent attempts to improve its standing through emulation by moving to a region occupied by agents reporting superior status. This simple goal pressures agents to aggregate into groups in the region of highest known status.

Decision Rules

To determine its next destination, each agent can first compute a common ordered set $V=\{v_i\}$, i.e., the set of all location vectors, according to the linear ordering $\leq$ of agents provided by the status function. The agent can then partition V to divide its fellow agents into two relative castes. The alpha caste is the set $A_0$ of all agents that have social standing superior to agent $\alpha_0$: $A_0=\{v_k|s_k>s_0\}$. The beta caste $B_0$ is the set of all agents that have social standing inferior to agent $\alpha_0$: $B_0=\{v_k|s_k\leq s_0\}$. The beta caste includes agents of equal status because an agent always seeks to improve its current status. The present invention includes various ways to use the alpha and beta castes to generate the agent's next heading. The vectors in $A_0$ can be used to influence the agent to move toward its members, creating a social pressure to improve by alpha-pull. The vectors in $B_0$ can be used to influence the agent to move away from its members, creating a social pressure to improve by beta-push. $A_0$, $B_0$ and V can be used to create pressure to aggregate. Alpha-pull and beta-push are heuristic in nature and do not necessarily lead to average improvement in arbitrary environments. Different decision rules based in the data vectors in $A_0$, $B_0$, V and subsets thereof can lead to different global behaviors of alpha-beta teams.

Zero Information Decision Rules

A special case is when $V=B_i$. In this case every agent has identical status, corresponding to a zero information or maximum information entropy state. When a zero information state is detected, the team can disperse to broaden the search area by using beta-push (all agents are in each other's beta castes) to compute a heading that leads agents on the outer edges of the cohort region away from the centroid of the region. As the density of the team decreases, more agents are free to move away from the centroid. A minimum limit on team density can prevent the ultimate loss of coherence.

Lost Agent Decision Rules

Another special case is when $V=\{\ \}$. In this case the agent has lost contact with all other agents. The "lost" agent can remain stationary, conserving energy until another agent comes within range. Alternatively, the lost agent can begin a random search, a gradient search, or use the last known heading to determine a new heading in hopes of reestablishing contact with the team.

A general form of an alpha-beta update rule uses a linear combination of the vector data in V, as in equation 1. In equation 1, a(k) is a weighting vector derived from the application of a scalar function to the current status measurements corresponding to vectors in V. The nature of the function applied to the status measurement vector and the specific subset of vectors selected from V determine the group behavior exhibited by the team.

$$v_i(k+1) = v_i(k) + a(k)[v_j(k) - v_i(k)] \qquad \text{Equation 1}$$

$A_0 = \{\ \}$ Decision Rules

If $A_0 = \{\ \}$ then agent $\alpha_0$ is the highest status agent in V (called a $\phi$-alpha agent). Such an agent can not experience alpha-pull, and therefore has two possibilities for movement: (1) remain stationary, and (2) move according to beta-push. Remaining stationary allows the agent to serve as a stationary beacon for the rest of the team. This can be a conservative strategy since it conserves energy and ensures that the agent remains at the top of the heap, but does not immediately explore the region of highest intensity. The second option uses beta-push to move the agent away from lower status agents. This can be a more risky strategy because the agent's status might decrease, but it can provide more information to the team.

$\forall j : s_0 \leq s_j$ Decision Rules

If an agent determines that no other agent has a lower status, then the agent must use alpha-pull to motivate motion.

$A_0 \neq \{\ \}; \exists j : s_0 > s_j$ Decision Rules

Agents that determine that some other agents have higher status and some other agents have lower status can use both alpha-pull and beta-push to motivate motion. There are many possible decision rules for such agents. In general, selection of a decision rule involves determination of whether to be conservative or speculative in the attempt to improve status. A conservative decision rule can move the agent toward but not beyond higher status agents. A speculative decision rule can use other agents to determine a likely direction but can move beyond the other agents.

Equation 2 shows a speculative decision rule. In equation 2, $v^*(k)$ is the location of a $\phi$-alpha agent, and $\mu$ is a factor that provides pressure to the agent to move beyond the $\phi$-alpha agent along a line passing through $v^*(k)$ and $v_i(k)$.

$$v_i(k+1) = v_i(k) + \mu[v^*(k) - v_i(k)] \qquad \text{Equation 2}$$

Equation 3 shows a more conservative decision rule. In equation 3, $V_A(k)$ are all the members of $A_i$, and $a(k)$ is the corresponding vector with elements given by equation 4. Movement according to the decision rule in equation 3 causes an agent to move toward the center of mass of the alpha set. Agents moving according to equation 3 will consequently tend to aggregate in the current region of highest status. The averaging of many alpha status positions can reduce the impact of noise and false high status readings.

$$v_i(k+1) = v_i(k) + a(k)[v_A(k) - v_i(k)] \qquad \text{Equation 3}$$

$$a_j(k) = s_j(k)/S(k); \; S(k) = \sum_{j=1}^{N} s_j(k) \qquad \text{Equation 4}$$

It can be desirable to combine conservative and speculative decision rules. For example, the speculative decision rule in Equation 2 can be made more conservative by using a weighted average or composite of higher status agents instead of a single highest status agent (combining Equation 2's exploration with Equation 3's resistance to noise and false sensor readings).

As another example, an agent can select among decision rules based on its status relative to other agents. An agent can select a speculative decision rule like that in equation 2 if it is one of the m highest status agents. Such a self-selected alpha agent will then try to improve its status by moving toward and overshooting a current $\phi$-alpha agent. Agents not in the m highest status agents can self-select a conservative decision rule like that in equation 3. Such agents will conserve energy by moving conservatively, but will still improve the overall status of the team. The description of collective dynamics and the sample results given below concern agents that self-select decision rules.

Collective Dynamics

The state-space formulation of the present invention comprises a system of linear, homogenous, time-varying difference equations of order N, where N is the instantaneous number of agents, as in equation 5.

$$v(k) = F(k)v(k-1) \qquad \text{Equation 5}$$

Figure 1:
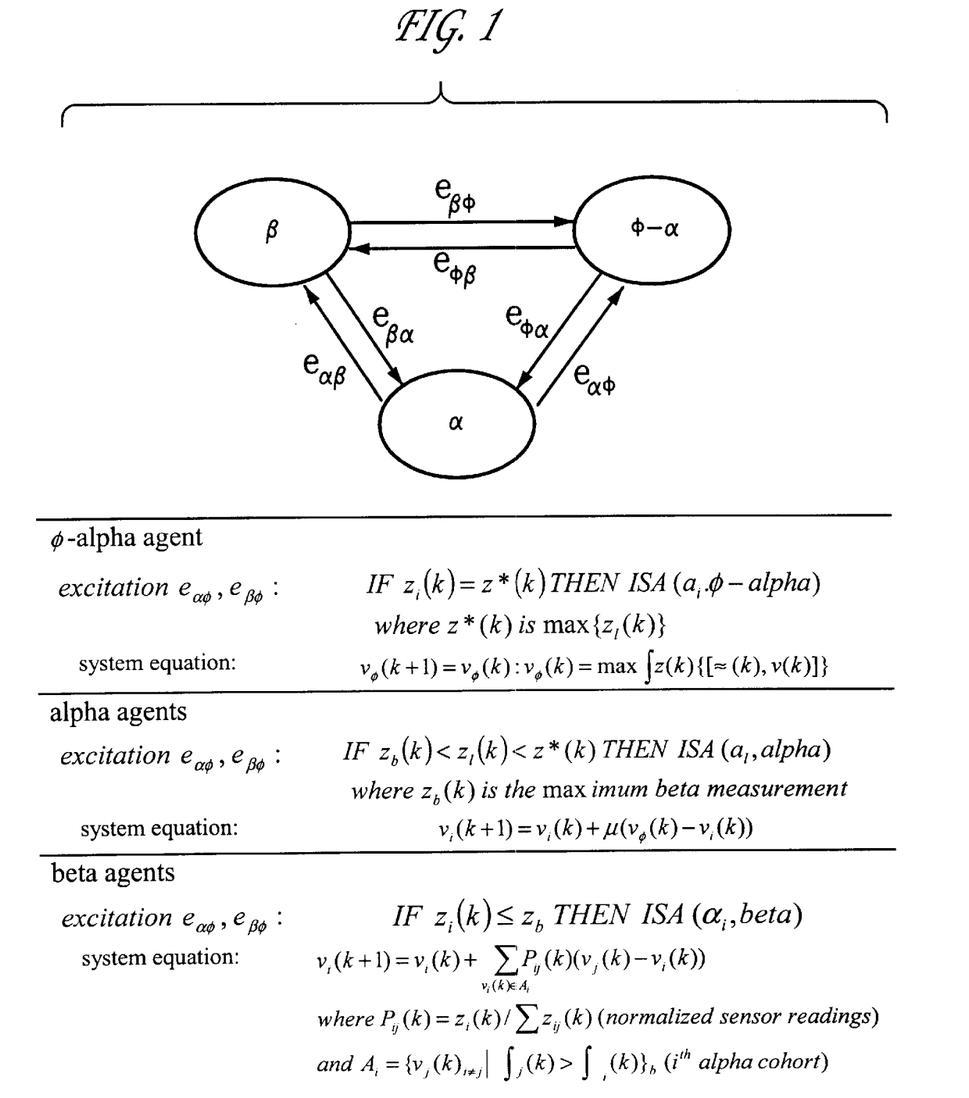
FIG. 1 shows the state transition map of an alpha-beta agent.

Let C be the set of all agents, $\{\alpha_1, \alpha_2, \ldots \alpha_N\}$, whose states are described by the data pairs $\{[z_i(k), x_i(k)]\}$, where $z_i(k)$ is the measurement vector and $v_i(k)$ is the position vector of the $i^{th}$ agent. Let $z(k) = s(k) + w(k)$ where $s(k)$ is the signal and $w(k)$ is measurement noise and other uncertainties, and $f(k)$ is a scalar function $F(z(k))$. FIG. 1 shows the state transition map of an alpha-beta agent. Transition excitations are logical functions that define the switching points in state space. The excitations and corresponding control structure for one form of alpha-beta coordination are set forth in FIG. 1.

The rows of the system matrix at step k reflect the independent decisions of the N agents. At step k the system state in terms of the transition matrix and initial state is given by equation 6.

$$v(k) = \Psi(k, k_0)v(k_0) \qquad \text{Equation 6}$$

The behavior of $\Psi(k,k_0)$ as $k \to \infty$ determines the stability of the system. The rows of $\Psi(k,k_0)$ represent the transition function of the $i^{th}$ agent at step k. An agent's behavior will be stable if its corresponding transition function is bounded for all time. The $\phi$-alpha and beta systems are asymptotically stable. The transition function of a $\phi$-alpha agent at step k is given by equation 7.

$$\Psi_\phi(k, k-1) = 1, \text{ for initial state condition } v_\phi(k-1) \qquad \text{Equation 7}$$

Thus $x_{100}(k-1)$ is a stable node of the system at step k. The transition function of a beta agent is given by equation 8.

$$\Psi_\beta(k, k-1) = \lfloor \rho_j^k | v_j \in A_\beta \rfloor, \qquad \text{Equation 8}$$
for initial state condition $v_j(k-1)$ Equation 5 represents a stable system iff all $\rho_j < 1$, the case that holds in an alpha-beta regime. The alpha agents that perform exploration can be stable, depending on the value of the convergence parameter $\mu$. The transition function of an alpha agent is given by equation 9.

$$\Psi_\alpha(k, k-1) = \lfloor 0\ 0\ \ldots\ (1-(1-\mu)^k)\ \ldots\ (1-\mu)^k\ \ldots\ 0\ 0 \rfloor \quad \text{Equation 9}$$

For exploration beyond the $\phi$-alpha node at $v_\phi$, $(k-1)$, $\mu>1.0$ must hold. An asymptotically stable transition function occurs when $1.0<\mu<2.0$ and $v_\phi(k-1)$ is the equilibrium point of the subsystem. The alpha subsystem is stable in the sense of Lyapunov when $1.0<\mu<2.0$ with an undamped oscillation about $v_\phi(k-1)$ occurring for $\mu=2.0$. Widespread exploration to escape a local extremum or plateaus can require that $\mu>2.0$ resulting in a temporarily unstable alpha subsystem. The sufficient condition for Lyapunov stability of the time-varying alpha subsystem is given by equation 10.

$$|\Psi(k, k_0)| < M \text{ for } k \geq k_0 \quad \text{Equation 10}$$

In equation 10, $|\Psi(k,k_0)$ is the norm (largest eigenvalue) of the transition matrix and M is a finite constant. Eigenvalues with exponential growth are associated with alpha and $\phi$-alpha points in the state space as described by equation 9. If $\mu>2.0$ and equation 9 holds for a specific alpha agent for all k, then the alpha trajectory will be oscillatory and will increase without bound along the line L determined by $L=v_{100}(k-1)-v_\alpha(k-1)$. Assuming the intensity $Z(v,t)$ is a Lyapunov function, i.e., $Z'\leq 0$ (the total derivative of Z is negative semidefinite) holds in the region of interest, and if $v_\phi(k-1)$ is not the maximum intensity point along L, then the alpha agent will eventually become a $\phi$-alpha agent upon discovering a point of higher intensity than $v_\phi(k-1)$ along L. The agent will then be governed by equation 7 and will remain a stable node until surpassed by a higher intensity value.

Equation 9 will govern the agent's behavior as k approaches infinity if $v_\phi(k-1)$ represents the point of maximum intensity (global maximum) in the region of interest. Accordingly, instability is possible only when the global maximum has been captured by at least one agent. Adaptive gain-scheduling techniques can reduce $\mu$ at convergence to stabilize the collective.

Sample Results

An alpha-beta coordination scheme was simulated in an ideal two dimensional world using ideal agents. The simulations illustrate the convergence and coordination properties of alpha-beta coordination. In the simulations, communication and sensing were noiseless, there were no obstacles, and agent movement at each step was bounded.

The target source was a radial emitter with exponential decay factor b and a uniform random noise component w, as in equation 11.

$$Z(r) = w + \exp-(r*b) \quad \text{Equation 11}$$

In equation 11 r is the radial distance from the origin. A metric of interest in the simulation is the mean-squared distance from the target, a measure of the team's learning rate and steady-state convergence error. For each simulation run, alpha-beta agents were initially positioned with the same distribution in the x-y plane. A control group comprising agents with identical starting points but with knowledge of the source location provided a baseline for the learning curve of the alpha-beta team. The simulation results confirm that the alpha-beta team can locate the target source.

Figure 2:
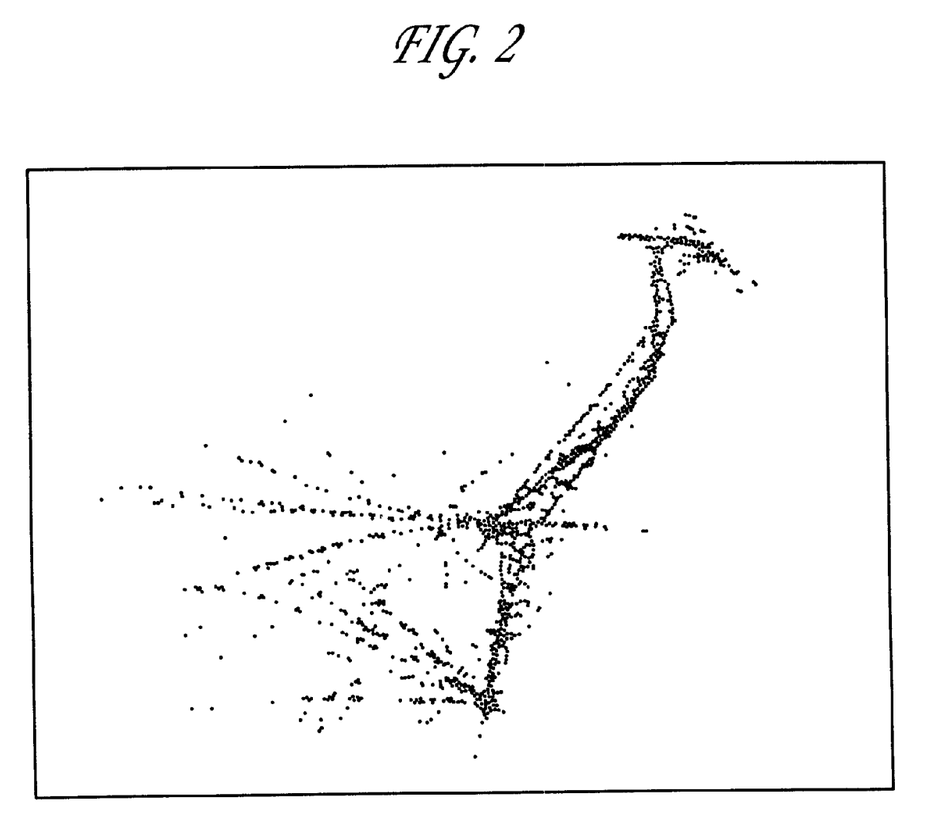
FIG. 2 shows the trajectories of a 50-agent alpha-beta team.

FIG. 2 shows the trajectories of a 50-agent alpha-beta team. The team started in the upper right of the figure, trying to locate a source at the center of the figure. The source intensity dropped to zero and the agents dispersed to the right to locate another source. The source reappeared in the lower center and the agents again converged upon it.

Figure 3A:
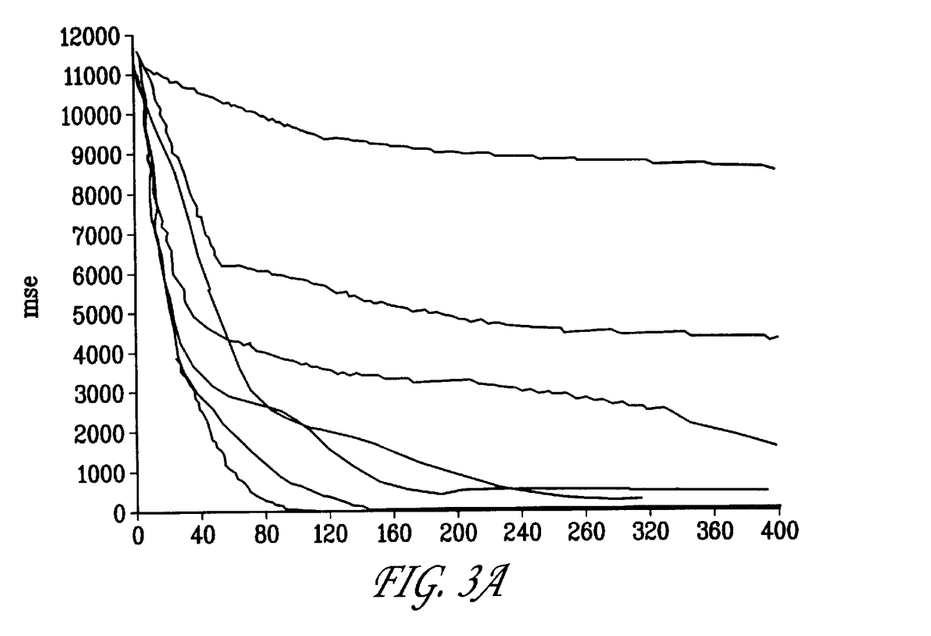
Figure 3B:
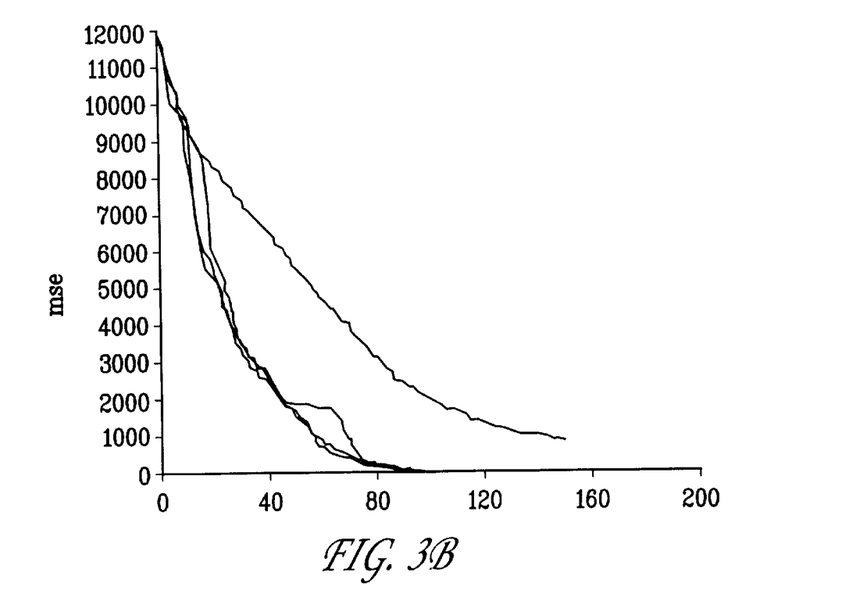

The ratio R of alpha agents to beta agents can be important to an effective search. R intuitively corresponds to the ratio of exploration to exploitation, and can be fixed or can vary dynamically during a search. A critical mass of alpha agents can be needed to influence the beta agents to follow the alpha trajectory. A ratio of not less than 0.4 was needed for reliable search given $\mu=2.0$. Maximum convergence rate and minimum steady-state mean-squared error occurred at R=0.5. FIG. 3(a,b) illustrates the learning curves for various alpha-beta ratios. Convergence was somewhat sensitive to $\mu$, favoring greater values of $\mu$ at the expense of increased steady state mean-squared error. Very large values of $\mu$ can slow the convergence rate and lead to larger steady state errors.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A method of coordinating collective search by a plurality of agents, comprising, on each agent:
   a) Determining an individual status corresponding to the agent's probability of being near the search goal;
   b) Determining the status of and direction to neighboring agents;
   c) Determining the number of higher status agents, where a higher status agent is a neighboring agent with a higher status than the agent;
   d) If the number of higher status agents is less than an alpha0 threshold, wherein the alpha0 threshold is greater than zero, then moving according to an alpha0 decision rule;
   e) If the number of higher status agents is less than an alpha1 threshold, wherein the alpha1 threshold is greater than zero, then moving according to an alpha1 decision rule;
   f) If the number of higher status agents is greater than or equal to the alpha1 threshold, then moving according to a beta decision rule.

2. The method of claim 1, wherein the alpha0 threshold is one.

3. The method of claim 1, wherein the alpha0 decision rule is selected from the group consisting of:
   a) Do not move; and
   b) Determining the direction to each neighboring agent with a lower status and moving in a direction derived from a combination thereof.

4. The method of claim 1, wherein the alpha1 decision rule is selected from the group consisting of:
   a) Do not move; and
   b) Determining the direction to a higher status agent and moving in a direction derived from the agent's current position and the higher status agent's current position.

5. The method of claim 1, wherein the alpha1 decision rule comprises determining the direction to a higher status agent and moving along the direction from the agent's current position to the higher status agent's current position.

6. The method of claim 1, wherein the beta decision rule comprises moving in a direction derived from the agent's current position and a combination of the direction to and status of the higher status agents.

7. The method of claim 1, wherein the beta decision rule comprises moving in a direction determined from the directions to the higher status agents weighted by the status of each corresponding higher status agent.

8. The method of claim 1, wherein the agents comprise mobile robots.

9. The method of claim 1, wherein the agents comprise software-implemented agents.

10. A method of coordinating collective search by a plurality of agents, wherein the position of agent i at time k is denoted $v_i(k)$, comprising, on each agent:
  a) Determining an individual status corresponding to the agent's probability of being near the search goal;
  b) Determining the status of and direction to neighboring agents;
  c) Determining the number of higher status agents, where a higher status agent is a neighboring agent with a higher status than the agent;
  d) Selecting a decision rule based on the number of higher status agents, then moving according to the selected decision rule.

11. The method of claim 10, wherein the decision rule for the case where the number of higher status agents is zero comprises $v_i(k)=v_i(k-1)$.

12. The method of claim 10, wherein the decision rule for the case where the number of higher status agents is zero comprises determining the directions to and status of lower status agents, and moving in a direction away from a combination of the lower status agents.

13. The method of claim 10, wherein the decision rule for the case where the number of higher status agents is at least one, with a higher status agent having a position $v^*(k)$, comprises $v_i(k+1)=v_i(k)+\mu[v^*(k)-v_i(k)]$, where $\mu$ is a scaling factor.

14. The method of claim 10, wherein the decision rule for the case where the number of higher status agents is at least one comprises $v_i(k+1)=v_i(k)+a(k)[v_A(k)-v_i(k)]$, where $v_A(k)$ is a vector of the positions of the higher status agents, $a(k)$ is a vector with elements $a_j(k)=s_j(k)/S(k)$, and $$S(k) = \sum_{j=1}^{N} s_j(k).$$

15. The method of claim 10, wherein the decision rule for the case where the number of higher status agents is at least one comprises
  a) determining whether the agent is one of the m highest status agents, where m is greater than one and less than or equal to the number of agents, and
  b) if so then selecting a higher status agent having position $v^*(k)$, and moving according to $v_i(k+1)=v_i(k)+\mu[v^*(k)-v_i(k)]$, where $\mu$ is a scaling factor, and
  c) if not then moving according to $v_i(k+1)=v_i(k)+a(k)[v_A(k)-v_i(k)]$, where $v_A(k)$ is a vector of the positions of the higher status agents, $a(k)$ is a vector with elements $a_j(k)=s_j(k)/S(k)$, and $$S(k) = \sum_{j=1}^{N} s_j(k).$$

16. The method of claim 10, wherein the decision rule for the case where the number of higher status agents is at least one comprises
  a) determining whether the agent is one of the m highest status agents, where m is greater than one and less than or equal to the number of agents, and
  b) if so then selecting one or more higher status agents and moving according to $v_i(k+1)=v_i(k)+a(k)[v_A(k)-v_i(k)]$, where $v_A(k)$ is a vector of the positions of the higher status agents, $a(k)$ is a vector with elements $a_j(k)=s_j(k)/S(k)$, $$S(k) = \sum_{j=1}^{N} s_j(k),$$

and $\mu$ is a scaling factor, and
  c) if not then moving according to $v_i(k+1)=v_i(k)+a(k)[v_A(k)-v_i(k)]$, where $v_A(k)$ is a vector of the positions of the higher status agents, $a(k)$ is a vector with elements $a_j(k)=s_j(k)/S(k)$, and $$S(k) = \sum_{j=1}^{N} s_j(k).$$

17. The method of claim 10, wherein the decision rule for the case where the number of higher status agents is less than the number of agents comprises moving in a direction determined from the directions to lower status agents weighted by the status of each corresponding lower status agent.

18. The method of claim 10, wherein the decision rule for the case where the number of higher status agents is at least one is selected from the group consisting of:
  a) Do not move;
  b) Moving in a direction derived from the agent's current position and a higher status agent's current position; and
  c) Moving in a direction derived from the agent's current position and a combination of the direction to and status of the higher status agents.

19. The method of claim 10, wherein the agents comprise mobile robots.

20. The method of claim 10, wherein the agents comprise software-implemented agents.

* * * * *